Sept. 9, 1947.   R. W. SHARTLE   2,427,233
GREASING DEVICE FOR ANTIFRICTION BEARINGS Filed March 9, 1944

INVENTOR
R. W. SHARTLE
BY *[signature]*
ATTORNEY

Patented Sept. 9, 1947

2,427,233

UNITED STATES PATENT OFFICE 2,427,233

GREASING DEVICE FOR ANTIFRICTION BEARINGS

Ralph W. Shartle, Clayton, Mo., assignor to Wagner Electric Corporation, St. Louis, Mo., a corporation of Delaware Application March 9, 1944, Serial No. 525,633

5 Claims. (Cl. 184—1)

Anti-friction bearings, such as ball bearings, cylindrical and cone bearings of the type known as "sealed" bearings, are furnished by the manufacturer in pre-greased condition ready for use. Experience has shown that the life of such bearings is limited, due to losses in their lubricating qualities. In some cases the bearing will fail due to lack of proper lubrication in as short a time as three hundred hours. Prior to my invention it has not been found possible to remove the old grease and replace it with new grease without not only disassembling the motor but also taking the bearing assembly apart and reassembling it after the re-greasing operation. This is not only a slow and expensive method of procedure but reassembly of the bearings is hardly feasible without the facilities utilized by the bearing manufacturer.

One object of my invention is to provide a device by means of which the old grease may be removed from an anti-friction bearing and new grease supplied without disassembling either the bearing or the machine to which it is applied; and further, to so construct the device that the re-greasing operation may be performed without interfering with the function of the bearing itself.

Figure 1:
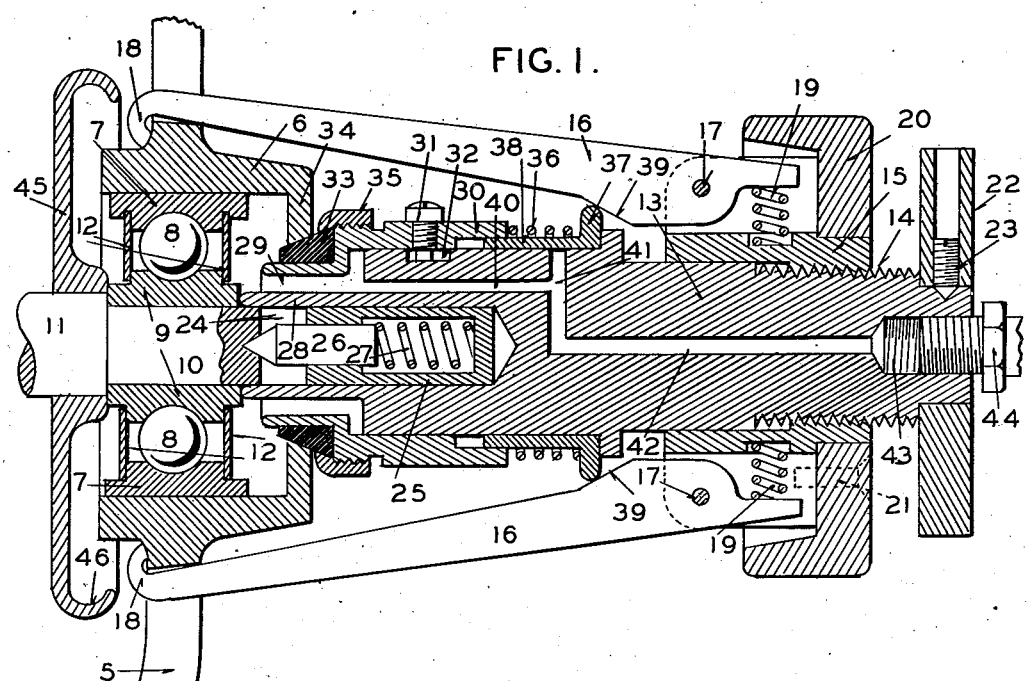
Figure 2:
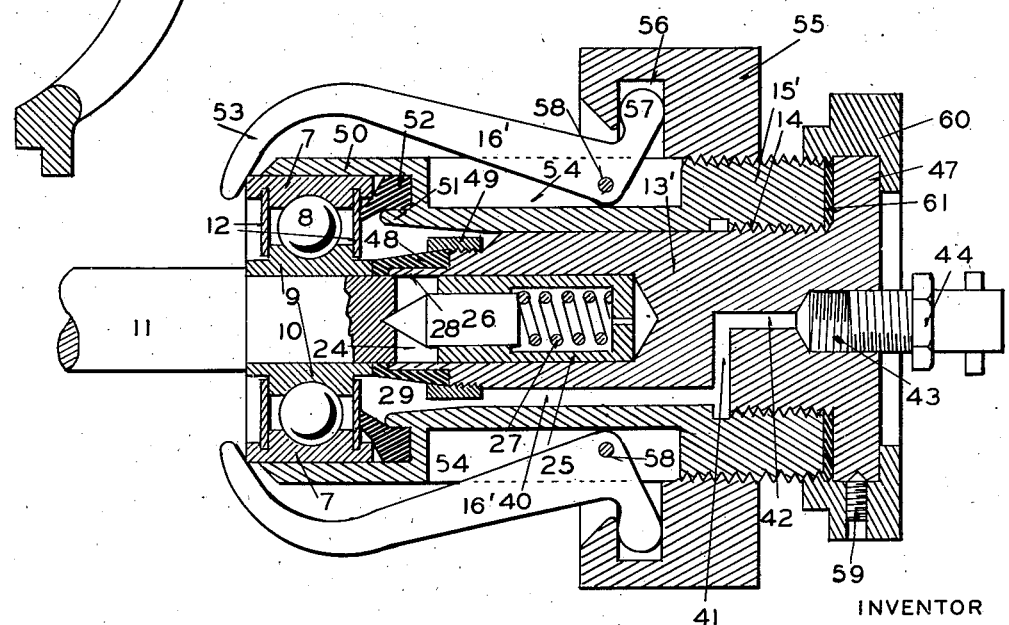

In the accompanying drawings which illustrate a greasing device made in accordance with my invention, Figure 1 is a longitudinal section of the device applied to the end plate of an electric motor, said end plate forming the outer part of the bearing mounting; Figure 2 is a view similar to Figure 1 but showing a modification in which the greasing device itself forms the outer part of the bearing mounting.

Referring first to Figure 1, the numeral 5 indicates the end plate of an electric motor having a hub 6 forming a seat for the outer race 7 of a ball bearing 8, the inner race 9 being mounted on the reduced end 10 of the rotor shaft 11 of the motor. The grease for the balls 8 is retained by a pair of sealing washers 12. These washers have liquid-tight contact with the outer race 7 but have a slight clearance from the outer face of the inner race 9. In practice this clearance is about five one-thousandths of an inch. The body of the device is formed by a cylindrical member 13, the rear end of which is reduced in size and provided with threads 14 for engagement with a support 15 carrying retaining arms 16 pivoted at 17 to the support, and provided at their forward ends with hooks 18 engaging the hub 6. Springs 19 interposed between support 15 and the tail pieces on the arms bias the hook ends of the arms inwardly. In order that support 15 may be rotated, it is provided with an operating ring 20 held against rotation relative to the support by any suitable means, such as a screw 21. While I have shown two arms 16, three or more may be employed if desired. The member 13 may be rotated by a disk 22 held on the member by a set-screw 23.

The forward end of member 13 is provided with a cylindrical opening 24 of the same diameter as the reduced end 10 of the rotor shaft. Mounted in this opening is a plug 25 having a centering pin 26 with a conical point for engagement with the lathe center in the end of the rotor shaft to insure concentric positioning of member 13 with respect to the shaft. The pin telescopes with the plug and is projected by a spring 27 so that the pin will engage with the shaft center even if the shaft end 10 is not of sufficient length to enter opening 24. The forward end of member 13 is reduced in diameter to provide an annular lip 28 for bearing against the end of the inner race 9 and making a liquid-tight joint therewith. Surrounding lip 28 and forming therewith an annular grease discharge passage 29, is the forward reduced end of a sleeve 30 slidingly mounted on member 13. The amount of sliding movement of this sleeve is limited by a screw 31 engaging with a slot 32 in member 13. Surrounding the reduced end of the sleeve is a conical sealing ring 33 of elastic material for entering a correspondingly shaped opening in the end flange 34 of hub 6 to form a liquid-tight joint therewith. The sealing ring is held in place by a nut 35. The sealing ring is biased toward seated position by a spring 36 positioned between the end of sleeve 30 and flange 37 on collar 38. This flange is adapted to engage with inclined faces 39 on arms 16 to move said arms on their pivots 17. The grease discharge passage 29 is connected by one or more longitudinal passages 40 and radial passages 41 with a central passage 42 terminating in a threaded opening 43 for the reception of a grease gun 44. If desired, a disk 45 may be mounted on the rotor shaft 10 adjacent the hub 6, said disk being provided with a groove 46 to catch grease forced out of the bearing.

In the operation of my device when it is desired to re-grease the bearing, the device is forced into the position shown in the drawings by an endwise movement. The springs permit arms 16 to separate sufficiently to pass over the greatest diameter of the hub and engage hooks 18 therewith, and spring 27 will cause pin 26 to engage with the lathe center of the shaft and thus properly center the device. When placed in operative position if the lip 28 and sealing ring 33 do not form perfectly tight joints with the inner race 9 and flange 34, respectively, the ring 20 is held and disk 22 rotated in a clockwise direction until proper contact is secured. The grease gun 44 is now attached and grease is forced through passages 40, 41, and discharge passage 29 into the space between the bearing and hub flange 34 filling such space. Further compression of the grease gun forces the grease through a slight clearance between the washers 12 and the inner race into the space between the two washers. This operation is continued until a large percentage of the old grease contained between the two washers is forced out and replaced by new grease. The discharged grease is either collected in groove 46 of disk 49 or drops between the arms of the end plate in case this disk is not employed. After the bearing has been re-greased, ring 20 is held against rotation and disk 22 is turned in a counterclockwise direction until the action of flange 37 on the inclined faces 39 of the arms forces the inner ends of said arms outwardly a sufficient distance to disengage hooks 18 from the hub when the greasing mechanism may be disengaged from the bearing.

Under some conditions met in practice it is desirable to re-grease the bearings when the end plates have been removed and the armature taken from the motor. In such cases the form of greasing device shown in Figure 2 is preferably used. This device operates on the same principle as that above described and is somewhat similar in general structure. In this form the body 13′, instead of being reduced in size at the rear end, is provided with a flange 47 and the annular lip 28 at its inner end does not contact directly with the inner ball race but is provided with an elastic sealing ring 48 for this purpose. The ring is held by a nut 49. The support 15′ is provided with threads 14 and is extended inwardly beyond the body 13′ and terminates in a cylindrical flange 50 of sufficient diameter to receive and support the outer ball race 7. Within flange 50 is a cylindrical lip 51 which cooperates with the flange to retain a resilient sealing ring 52 which contacts the adjacent washer 12 to form a grease-tight contact radially beyond the washer clearance. The flange 50 terminates somewhat short of the inner end of race 7 so as to permit engagement of said race by the curved ends 53 of arms 16′ pivoted in slots 54 in the support 15′. The support 15′ has threaded upon it a ring 55 provided with an internal cam groove 56 engaging with outwardly extending end 57 of arms 16′ to move said arms on their pivots 58. Secured to flange 47 of the body 13′ by means of a set-screw 59, is a disk 60 by means of which the body may be rotated. A gasket 61 is preferably interposed between the end of body 15′ and flange 47 to prevent possible escape of grease.

In the operation of the form of greasing device shown in Figure 2, the body is prevented from rotating by holding the disk 60 and turning ring 55 in a counter-clockwise direction until the action of the cam groove 56 on extension 57 of arms 16′ separates the inner ends of these arms far enough to permit their curved ends 53 to pass over the bearing. The device can now be applied to the bearing by a longitudinal movement. The disk 60 is now held and ring 55 turned in a clockwise direction to force the curved ends 53 of the arms against the inner end of the bearing and insure tight contact between the sealing ring 52 and the washers 12 and between the sealing ring 48 and the race 9. The grease gun 44 is now applied and operated as in the previously described construction to force out a large percentage of the old grease in the bearing and replace it with new grease.

Having fully described my invention, what I claim as new and desire to secure by Letters Patent of the United States is:

1. In a greasing device for an anti-friction bearing having an inner race mounted in a machine housing comprising a body member provided with a threaded portion and having a portion engageable with the inner race of the anti-friction bearing; means on said body member engageable with the housing in which the bearing is received; centering means in said body member to position it with respect to said bearing and said housing; a support having a threaded bore engageable with the threads on said body; a plurality of arms on said support having means thereon engageable with the housing receiving the bearing, said support upon rotation relative to said body urging said portion into engagement with the inner bearing race and said means in said arms into engagement with said housing; means to prevent leakage of grease from said housing; and means to introduce grease into said body, thence into the housing receiving the bearing and thence into the anti-friction bearing.

2. In a greasing device for an anti-friction bearing having an inner race comprising a body member engageable with the inner race of the anti-friction bearing; means in said body engageable with a shaft on which the anti-friction bearing is mounted to center said body with respect to the bearing; means telescopically mounted on said body receivable in an aperture in a machine housing in which the bearing is mounted; a support threaded to said body; a plurality of arms on said support engageable with the machine housing to urge said body and said means into engagement with the bearing race and the machine housing upon relative rotation of said means and said body; and means through which grease is forced under pressure into said body and into the bearing in the machine housing.

3. In a greasing device for an anti-friction bearing having an inner race mounted on a shaft in a bearing receiving member of a machine comprising a body member having a threaded portion and engageable with the inner race of the anti-friction bearing; a sleeve member on said body member receivable in an aperture in the bearing receiving member; resilient means to urge said sleeve into said aperture; an arm support provided with threads and engageable with the threads on said body member; arms on said support engageable with the bearing receiving member to urge said body member into engagement with the inner bearing race upon relative movement of said support and said body member; and means through which grease is forced under pressure into said bearing receiving member and thence into the anti-friction bearing.

4. In a greasing device for an anti-friction bearing having an inner race mounted on a shaft in a machine bearing receiving member comprising a body member provided with a threaded portion and engageable with the inner race of the anti-friction bearing; a sleeve slidably mounted on said body; a sealing ring on said sleeve receivable in an aperture in the machine bearing receiving member; means to urge said sealing ring into the machine aperture; a support on said body member and having a threaded portion engageable with the threads on said body member; arms on said support engageable with the machine bearing receiving member to urge said sealing ring into said aperture when said support is moved relative to said body; and means through which grease is forced under pressure into said body and thence into the anti-friction bearing.

5. In a greasing device for an anti-friction bearing having an inner race mounted on a shaft and received in a machine member comprising a body member engageable with the inner bearing race of the anti-friction bearing; means in said body including a portion engageable with the shaft to center said body with respect to said shaft and said bearing race; a sleeve slidably mounted on said body member; a sealing ring on said sleeve receivable in an aperture in the machine member; a spring to urge said sealing ring into said aperture; a support having means thereon mounted on said body member; arms on said support engageable with the machine member; means to move said support axially of said body member; and means through which grease is introduced under pressure into said body member and thence into said anti-friction bearing.

RALPH W. SHARTLE.

REFERENCES CITED

The following references are of record in the file of this patent:

UNITED STATES PATENTS

| Number | Name | Date |
|---|---|---|
| 1,766,208 | Austiss | June 24, 1930 |
| 2,160,214 | Jackson | May 30, 1939 |
| 2,168,746 | Saal | Aug. 8, 1939 |
| 2,187,608 | Kropp | Jan. 16, 1940 |
| 2,248,940 | Berg | July 15, 1941 |

FOREIGN PATENTS

| Number | Country | Date |
|---|---|---|
| 495,468 | England | Feb. 8, 1937 |

Certificate of Correction

Patent No. 2,427,233. September 9, 1947.

RALPH W. SHARTLE

It is hereby certified that errors appear in the printed specification of the above numbered patent requiring correction as follows: Column 5, line 24, and column 6, line 1, strike out the words "having means thereon" and insert the same after the word "support" in column 6, line 2; and that the said Letters Patent should be read with these corrections therein that the same may conform to the record of the case in the Patent Office.

Signed and sealed this 18th day of November, A. D. 1947.

[SEAL]

THOMAS F. MURPHY,
*Assistant Commissioner of Patents.*